United States Patent [19]

DeFilippis et al.

[11] 4,445,079

[45] Apr. 24, 1984

[54] ELECTROMAGNETIC RELAYS

[75] Inventors: Pietro DeFilippis, Caserta; Amedeo Salvatore, Naples; Ciro Calenda, Aversa; Giuseppe Notaro, Pomigliano D'Arco, all of Italy

[73] Assignee: Texas Instruments Incorporated, Dallas, Tex.

[21] Appl. No.: 322,827

[22] Filed: Nov. 19, 1981

[30] Foreign Application Priority Data

Nov. 19, 1980 [IT] Italy .............................. 50204 A/80

[51] Int. Cl.[3] .............................................. H02P 1/42

[52] U.S. Cl. .................................... 318/792; 318/789; 361/29

[58] Field of Search ............... 318/788, 783, 785, 789, 318/791, 792; 361/24, 25, 27–29, 106; 338/22 R; 335/187, 185

[56] References Cited

U.S. PATENT DOCUMENTS 2,261,250 11/1941 Haddad .............................. 172/278
2,758,175 8/1956 Hotchkiss ............................ 200/122
3,172,011 3/1965 Flanagan et al. .
3,322,998 5/1967 Norley .................................... 315/8
3,486,080 12/1969 Tillmann ............................ 317/132
3,546,651 12/1970 Moorhead et al. ................. 337/102
3,586,939 6/1971 Buiting et al. .................. 318/221 E
3,723,925 3/1973 Alten .................................. 335/187
3,965,392 6/1976 Moorhead ............................ 361/29
4,161,681 7/1979 Rathje ............................ 318/792 X
4,234,904 11/1980 Fahlesson ...................... 361/106 X
4,241,370 12/1980 De Filippis et al. ............ 361/29 X

*Primary Examiner*—G. Z. Rubinson
*Assistant Examiner*—Patrick C. Keane
*Attorney, Agent, or Firm*—James P. McAndrews; John A. Haug; Melvin Sharp

[57] ABSTRACT

An improved electromagnetic relay having a wafer of material with positive temperature coefficient of resistivity (PTC) mounted inside the relay combines a sturdy construction with low manufacturing costs adapting the relay for use as a starting relay for electric motors of compressors. For this purpose, the magnetic members of the relay are incorporated in the electrical relay circuit and are provided with attachments for plug-on connections of the relay to circuit pins of motor-compressor units.

10 Claims, 6 Drawing Figures

ELECTROMAGNETIC RELAYS

BACKGROUND OF THE INVENTION

The present invention relates to an improved electromagnetic relay which combines sturdy construction with low manufacturing costs.

The relay coil is adapted for excitation through a wafer composed of a material with a positive temperature coefficient of resistivity (PTC), which material is well known in this art, for providing for temporary excitation of the relay coil.

The relay according to the invention lends itself particularly well to the control of starting windings of electric motors of the single-phase type as are usually used in refrigeration compressors and the like. For this particular purpose, the relay is provided with "plug on" connection attachments for direct connection on pins on the housings of motor-compressor units. Other methods are, of course, likewise possible.

As will be seen later, the relay in question presents numerous features which simplify assembly, thus reducing costs, and have other features which, costs being equal, give superior performance.

DESCRIPTION OF THE DRAWINGS

The present invention will now be described by reference to an embodiment of the invention as presently preferred, said embodiment being given by way of example only and not for the purpose of limiting its scope, and being described by reference to the attached drawings wherein.

DESCRIPTION OF THE PREFERRED EMBODIMENTS

Figure 1:
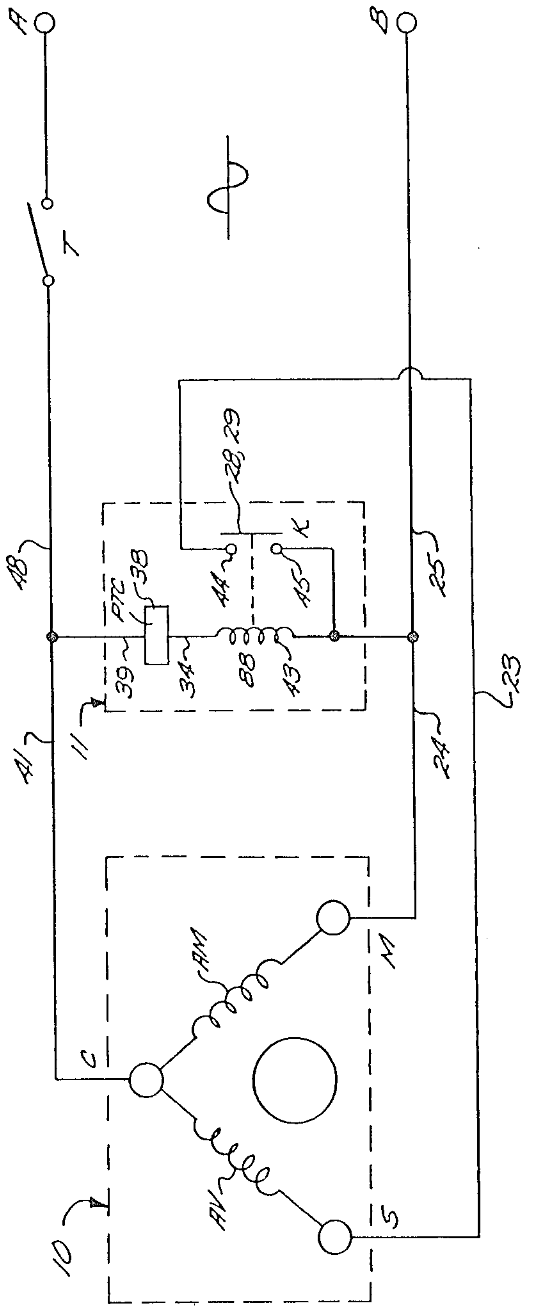
FIG. 1 shows a typical circuit arrangement in which the electromagnetic relay according to the present invention can be immediately used.

As seen in FIG. 1, 10 diagrammatically denotes a typical single-phase induction motor, having an operating winding AM and a starting winding AV.

As is known, to start a motor it is necessary to excite for a brief period of time the starting winding AV and then to terminate excitation of the start winding before the winding overheats. Many systems are known to affect such a temporary excitation of the start winding.

In the arrangement illustrated, the common "C" of the motor 10 is connected to line A by means of a switch T. The terminal M of the operating winding AM is directly connected to the line terminal B. Terminal S of the starting winding AV is connected to line terminal B by way of a movable contact K of the relay of this invention denoted 11 as a whole. Movable contact K is controlled by the electromagnet BB of the relay, which, as is noted, is excited by current passing between lines A and B for brief period of time through a wafer of PTC material with a positive temperature coefficient of resistivity, which material is well-known to persons skilled in this art. (Said wafer material has at ambient temperature a low resistance which rises to very high value as the material is heated and therefore terminates relay operation after a brief period and self-regulates the operating temperature of the relay as the wafer material is self-heated by directing electrical current through the wafer to the start winding AV.)

Figure 2:
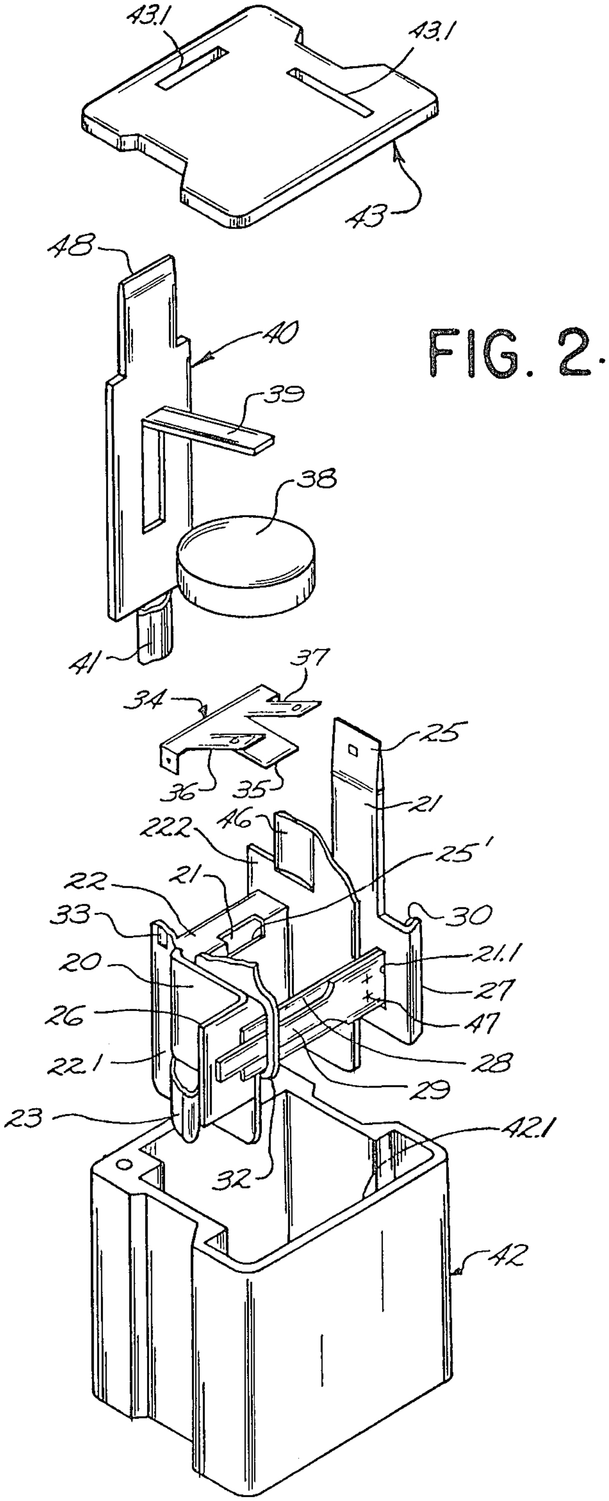
FIG. 2 shows schematically an exploded axially arranged view of the relay according to the invention for illustration of the various components.

Referring now to FIG. 2, the construction of the relay according to the present invention will be illustrated. As is seen, the relay includes a pair of elements 20, 21 which form the static magnetic circuit and are also traversed by the electric current as will be seen later on.

Elements 20, 21 are made of soft iron, typically plated with a good electrical contact metal (silver or nickel or the like) and are mounted by force fits in apertures 20*a* and 21*a* (see FIG. 4) in an insulating support 22, the elements initially being electrically insulated from one another by the support. To element 20 an electrical connection element of the "plug-on" type denoted by 23 is fastened in electrical engagement thereto by welding or the like. Likewise, to element 21 a similar connection element 24 (not shown in FIG. 2) is fastened. The element 24 is shown in FIGS. 3–6. At the upper part of element 21, a male element of a "fast-on" connection is fastened or cut out, said element being denoted by 25.

Support 22 is formed so as to constitute the reel for winding the relay excitation winding 43 thereon, the coil comprising a copper wire or the like having an insulating coating thereon. (See FIGS. 5 and 6)

At the starting or first end portion of the winding 43, support 22 is provided with an aperture $25^1$ (see FIGS. 2 and 4) which opens into the aperture 21*a* and exposes a corresponding part of the previously defined element 21. This aperture $25^1$ allows the starting or first end of the copper wire forming the relay winding 43, when stripped of its insulation, to make contact with the exposed part of the element 21 and to realize an electrical connection to the element 21, preferably without soldering in a manner substantially equivalent to "wire-wrap" connections wherein the winding of the copper wire of the coil 43 holds the first end of the coil wire against the core element 21 at the support aperture 25′ in electrical engagement with the core element 21.

The ferromagnetic element 20 is bent at 26 to form a pole shoe of the magnetic circuit and to support an electrical contact 44. The ferromagnetic element 21 is provided with a tongue 27 on which the movable armature 28 of the relay is fastened and on which, in turn, a contact spring 29 of copper and beryllium alloy or the like is fastened which supports a contact 45 corresponding to the contact 44 provided on part 26. The spring 29 is typically welded to the armature 28 as indicated at 47 in FIG. 2. The element 21 is then provided with an opening 21.1 and with a boss 21.2 (See FIG. 3) which extends into the opening 21.1 from one side of the opening. The armature 28 has a corresponding opening 28.1 (See FIG. 3) adapted to fit over the boss 21.2 when the end of the armature 28 with its attached spring 29 is fitted into the element opening 21.1. In that arrangement, the armature is pivotable on the element 21 and, as will be understood, energizing of the exciting coil 43 establishes a magnetic field in the magnetic circuit formed by the elements 20 and 21 and by the armature 28 tending to pivot the armature and draw toward the pole shoe 26 to engage the contacts 44 and 45 with each other to close an electrical circuit between the contacts. Contact spring 29 is extended at 30 and cooperates with tongue 27 to furnish the elastic working force for movable armature 28 tending to separate contact 45 from contact 44. The working force can be adjusted by deformation of tongue 27.

The width of contact spacing effected by the movable armature 28 is determined by extensions 31, 32 of one wall of the support 22 wich are fitted around the armature. (see FIGS. 4–6).

Support 22 is pre-disposed to hold a spring element 34 substantially of an "E" configuration by way of an aperture 33 on one wall 22.1 of said support and by a similar aperture on a second wall 22.2 thereof. The central tongue 35 of the spring 34 is predisposed to make contact with the copper wire at the outer surface of the electrical winding 43 of the relay (See FIG. 5) and is particularly adapted to engage the exposed tail or secondary, opposite end 35.1 of the wire which is stripped of its insulating coating so as to obtain an electrical connection preferably without the need of soldering.

The other tongues 36, 37 of the spring 34 are upwardly disposed so as to make contact with the lower surface of a wafer 38 of ceramic material or the like of a positive temperature coefficient resistivity (PTC). (See FIG. 6). Wafer 38, of a material well-known to an expert in this field, has a very low resistance when cool but, upon passage of electrical current therethrough after a specific time (about one second) as determined by the physical constants of the wafer itself and of the particular material used in the wafer, heats up and increases the resistance of the wafer to a very high value on the order of 500K ohms or the like and is therefore equivalent to an open circuit.

Wafer 38 is held in position against the force of spring 34 by finger element 39 of component 40, on which is fastened an electrical connection element of the plug-on type 41 and a male element of "fast-on" type 48 above it.

All of the elements described above are inserted in a body of electrically insulating plastic material 42, and are held in position by way of force fit insertion or the like and are protected by a covering element 49 preferrably of a stiff insulating material or the like which is secured at open end 42.1 of the body by a force fit or by other conventional means. The cover has apertures 43.1 to fit over the "fast-on" connections 25 and 48. The body 42 has apertures 43.2 in the bottom of the body aligned with plug-on connections 23, 24 and 41 as will be understood.

Figure 3:
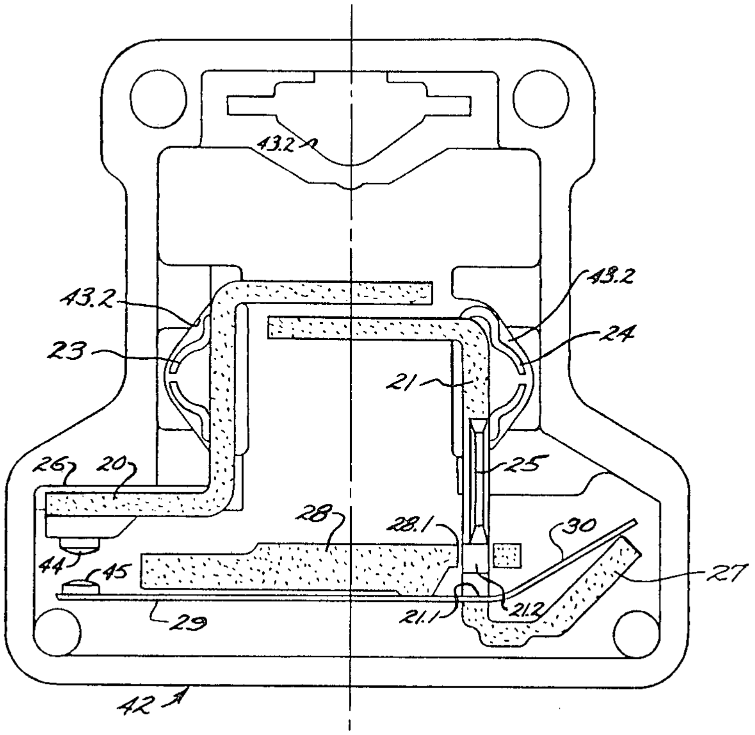
FIGS. 3, 4, 5 and 6 show various plan views of the relay from above having selected components of the relay removed to illustrate the relationship between the parts shown in FIG. 2.
Figure 4:
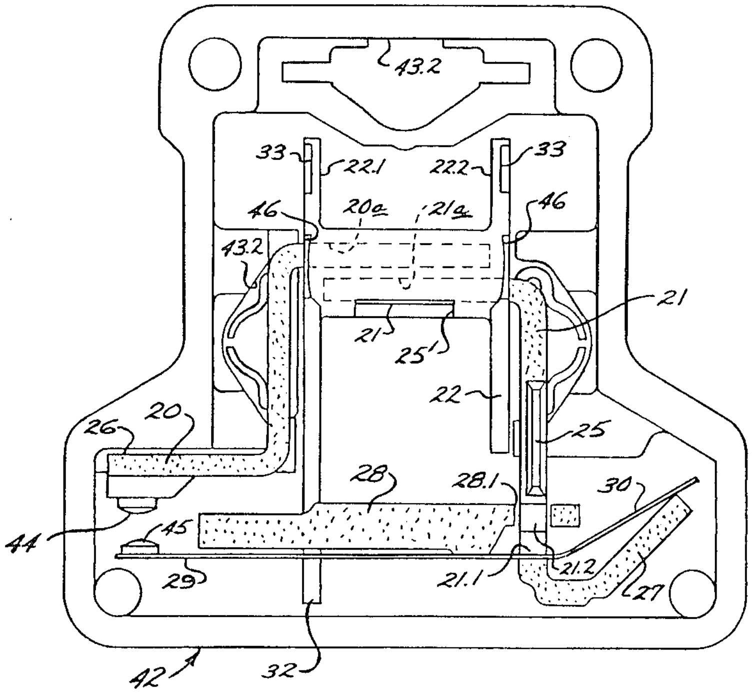

Referring now to FIG. 4 the same shows the basic structure of support 22 and of the various parts associated therewith. The same reference numbers as in FIGS. 2 and 3 are used to denote corresponding parts.

Figure 5:
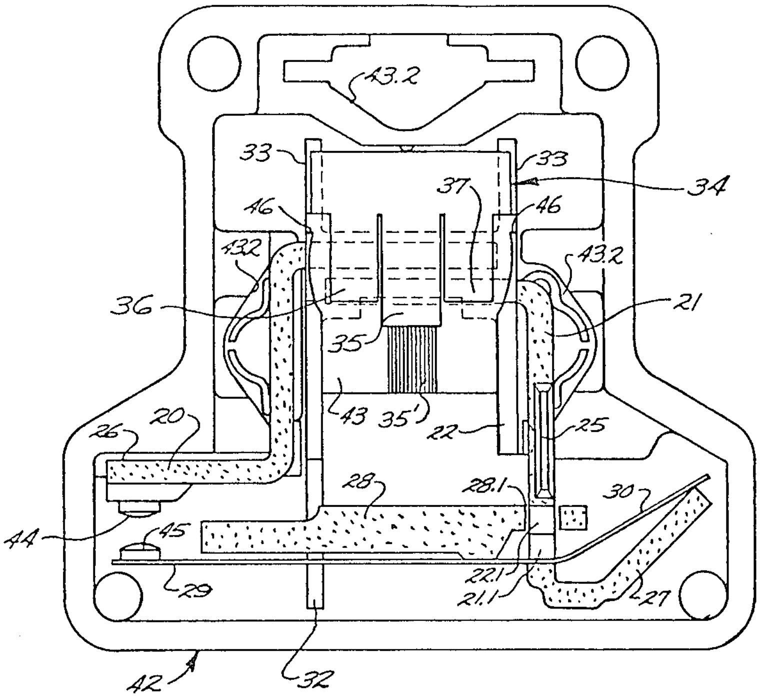

Referring now to FIG. 5, the same shows the arrangement of spring 34 and of tongue 35 which makes contact to the exposed wire coil end 35′ of the winding 43 of the relay.

Figure 6:
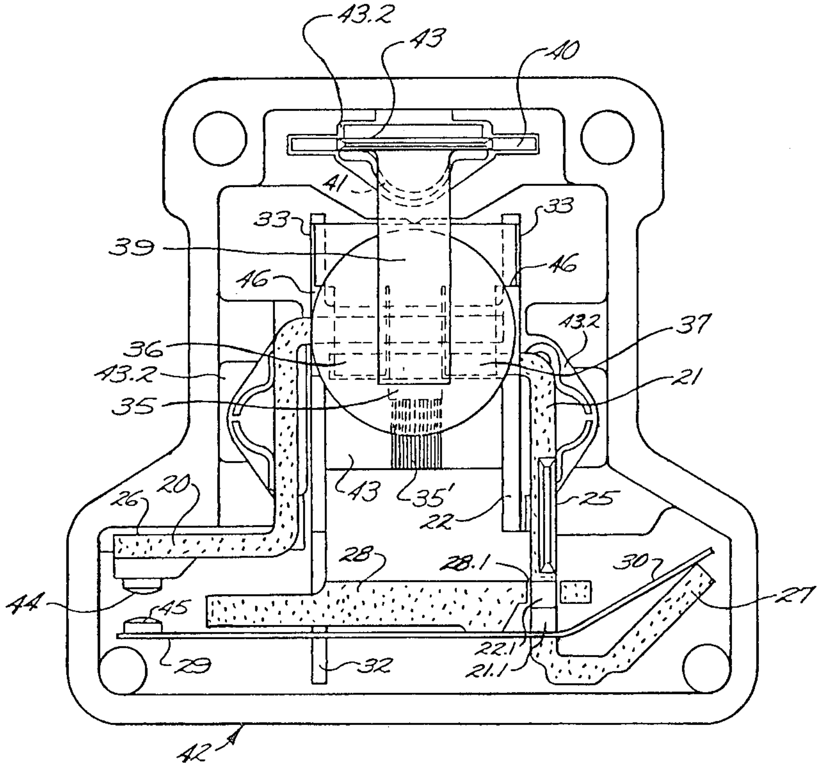

Referring now to FIG. 6, the same shows the means for holding wafer 38, comprising finger element 39 of component 40. Preferrably portions 46 of the support 22 aid in positioning the wafer 38 as indicated in FIG. 6.

The relay according to the present invention makes it possible to make use of the particular construction so as to obtain an initial closing of the contacts across the fixed contact 44 disposed on the element 26 and the contact 45 disposed on the spring element 29 when T is closed for starting the motor 10 and, therefore, a thorough contact action so as to support elevated currents between the conducting element 26 and the metallic part of armature 28 to energize the start winding AV. The relay is also adapted to effectively open the start winding circuit AV after motor starting occurs as the resistance of the wafer 38 rapidly increases as the wafer is heated by the start winding current being directed through the wafer as noted above.

In that way, closing of the switch T connects the line terminals A, B through the fast on terminals 48 and 25 respectively to the common C and the terminal M of the main winding AM of the motor 10 via the repective plug on connectors 41 and 24 and also directs current between terminals A and B through the finger element 39, the wafer 38, the spring 34, the coil 43, the magnetic element 21 and the fast on connector 25 for energizing the relay coil 43, thereby to engage the contacts 44 and 45 for energizing the starting winding AV of the motor 10 through the magnetic element 20 and the plug on 23 to start the motor 10. As motor starting occurs, the wafer 38 is self-heated by the start winding current being directed through the wafer and increases in resistance to decrease relay coil current after a selected period of time, thereby to de-energize the relay coil 43 for permitting the contact 44 and 45 to separate by action of a biasing spring 29 for de-energizing the starting winding AV. The temperature of the wafer 38 self-regulates and stabilizes at a safe temperature level as the wafer resistance increases to a pre-determined level as will be understood. In that way, the relay 11 provides for desired motor starting with an improved low-cost construction.

At this point, the entire structure of the relay according to the present invention has been illustrated in full detail. It should be understood, however, that the above illustration has been given by way of example only and in no way limits the scope of the present invention, and it should be therefore understood that the form of realization detailed above can be modified by an expert in this art without thereby departing from the scope of the protection of the present invention.

We claim:

1. Electromagnetic relay with controlled time of activation comprising magnetic circuit means energizable for performing a control function, an exciting winding for energizing said magnetic circuit, and means for activating said winding from a power source for a predetermined time and for thereafter deactivating the winding, said means comprising an element of positive temperature coefficient of resistivity (PTC) connected in series between said winding and the electric power source, characterized in that first and second conductive elements are connected to respective line terminals of said power source and in that said exciting winding includes a wire coil having one bared end of said coil wire wound on said first conducting element to be electrically connected to the source of electrical power, having an opposite bared end of said wire, and having means resiliently engaged with said opposite bared end of the wire connecting the opposite wire end with said second conducting element to be electrically connected to said source of electric power.

2. Electromagnetic relay as set forth in claim 1 further characterized in that said second conducting element is further connected to means engaging said PTC element controlling the excitation of the exciting winding.

3. Electromagnetic relay as set forth in claim 2 further characterized in that portions of the electrically conducting means connecting the exciting winding to said power source also serve as components of the magnetic circuit.

4. Electromagnetic relay as set forth in claim 3 further characterized in that a movable armature is connected to a spring, said armature is movable in response to energizing of the magnetic circuit to engage a pair of electrical contacts and close an electrical circuit to perform a control function, and the spring is extended so as to mechanically cooperate with a stationary means incorporated in the relay so as to act as a restoring spring for the movable armature to disengage the contacts and open said electrical circuit when the magnetic circuit is de-energized.

5. Electromagnetic relay as set forth in claim 4 further characterized in that said stationary means against which the said restoring spring acts are deformable for calibrating the relay.

6. Electromagnetic relay as set forth in claim 5 is further characterized in that the pair of contacts are normally set apart by effect of the contact holding spring and are engaged by movement of the movable armature in response to energizing of the magnetic circuit.

7. Electromagnetic relay as set forth in claim 6 further characterized in that the mass of movable parts and the elastic constants of components of the relay are chosen so that the resonance frequency of said movable parts is substantially below the main harmonicomponent of the exciting current.

8. Electromagnetic relay as set forth in claim 6 further characterized in that the electrically active components of said relay are provided with means for electrical connection with rapid attachment to terminals of said power source and to start winding, main winding and common terminals of a single-phase electric motor.

9. Electromagnetic relay as set forth in claim 8 further characterized in that at least part of said electrical connection means is executed as a terminal for direct soldering on printed circuits.

10. Electromagnetic relay as set forth in claim 9 in combination with a singe-phase induction motor for use as a starting relay of the motor.

* * * * *